United States Patent
Yang et al.

(10) Patent No.: US 9,571,815 B2
(45) Date of Patent: Feb. 14, 2017

(54) METHOD FOR 3D IMAGE SIGNAL PROCESSING AND IMAGE DISPLAY FOR IMPLEMENTING THE SAME

(75) Inventors: Jeong-Hyu Yang, Seoul (KR); Jong-Yeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 13/132,969

(22) PCT Filed: Aug. 19, 2009

(86) PCT No.: PCT/KR2009/004620
§ 371 (c)(1),
(2), (4) Date: Jun. 6, 2011

(87) PCT Pub. No.: WO2010/071291
PCT Pub. Date: Jun. 24, 2010

(65) Prior Publication Data
US 2011/0242278 A1    Oct. 6, 2011

Related U.S. Application Data

(60) Provisional application No. 61/138,941, filed on Dec. 18, 2008.

(51) Int. Cl.
*H04N 13/00* (2006.01)
*H04N 13/02* (2006.01)

(52) U.S. Cl.
CPC ...... *H04N 13/0066* (2013.01); *H04N 13/0022* (2013.01); *H04N 13/0275* (2013.01);
(Continued)

(58) Field of Classification Search
CPC ............ H04N 13/0022; H04N 13/0048; H04N 13/0275
See application file for complete search history.

(56) References Cited

U.S. PATENT DOCUMENTS 6,335,765 B1 *   1/2002  Daly et al. ................... 348/586
6,621,921 B1     9/2003  Matsugu et al.
(Continued)

FOREIGN PATENT DOCUMENTS

CN     101035261 A    9/2007
CN     101047848 A   10/2007
(Continued)

OTHER PUBLICATIONS

Fhn et al: "Depth-image-based rendering(DIBR), compression, and transmission for a new approach on 3D-TV", Proceedings of the International Society for Optical Engineering (SPIE),, vol. 5291, No. 2, May 31, 2004 (May 31, 2004), pp. 93-104, XP008154309, DOI: 10.1117112.524762 *Abstract; Sections 1, 5 & 6*.
(Continued)

*Primary Examiner* — Dave Czekaj
*Assistant Examiner* — Md Haque
(74) *Attorney, Agent, or Firm* — Dentons US LLP

(57) ABSTRACT

A method for processing a 3D image signal and an image display device for implementing the method are provided. The 3D image signal processing method is implemented by the 3D image display device. Although an image signal transmission side transmits information to be included in a plurality of image signals, while omitting a portion of the information, a receiver can synthesize the transmitted information to reproduce an image. The device restores at least one image from a broadcast signal, and additionally generates an image at a virtual camera view from the restored image and displays it three-dimensionally. To this end, the image display device receives a broadcast signal and obtains at least one set of camera parameters from signaling information. Then, the image display device generates a virtual view image according to the camera parameters, and formats
(Continued)

the virtual view image and the broadcast image included in the broadcast signal three-dimensionally.

6 Claims, 9 Drawing Sheets

(52) U.S. Cl.
CPC ... *H04N 13/0048* (2013.01); *H04N 2213/003* (2013.01); *H04N 2213/005* (2013.01)

(56) References Cited

U.S. PATENT DOCUMENTS

| | | | |
|---|---|---|---|
| 7,065,140 | B1* | 6/2006 | Ritter et al. ............ 375/240.25 |
| 2002/0080139 | A1* | 6/2002 | Koo et al. .................... 345/473 |
| 2002/0094190 | A1* | 7/2002 | Katayama ...................... 386/29 |
| 2002/0113865 | A1* | 8/2002 | Yano et al. ..................... 348/47 |
| 2003/0156751 | A1* | 8/2003 | Lee .......................... G06K 9/03 382/154 |
| 2004/0217920 | A1* | 11/2004 | Ishikawa ......................... 345/32 |
| 2004/0222987 | A1* | 11/2004 | Chang ................ G01B 11/2509 345/419 |
| 2005/0024724 | A1* | 2/2005 | Kim ........................ G06T 15/08 359/462 |
| 2005/0253967 | A1* | 11/2005 | Yoshida ................... H04N 5/46 348/556 |
| 2005/0256950 | A1* | 11/2005 | Suzuki .................... G06T 19/00 709/223 |
| 2006/0007301 | A1* | 1/2006 | Cho et al. ....................... 348/51 |
| 2007/0116383 | A1* | 5/2007 | De Haan ....................... 382/299 |
| 2007/0165048 | A1* | 7/2007 | Yamashita ............. G06T 5/009 345/601 |
| 2007/0182730 | A1* | 8/2007 | Mashitani et al. ............ 345/419 |
| 2007/0279494 | A1* | 12/2007 | Aman et al. .................. 348/169 |
| 2007/0296721 | A1* | 12/2007 | Chang et al. ................. 345/427 |
| 2008/0152192 | A1* | 6/2008 | Zhu .................... G06K 9/00771 382/103 |
| 2008/0222705 | A1* | 9/2008 | Goodmon et al. ................ 726/4 |
| 2009/0092311 | A1* | 4/2009 | Kim et al. ..................... 382/154 |

FOREIGN PATENT DOCUMENTS

| | | |
|---|---|---|
| CN | 101123734 A | 2/2008 |
| CN | 101156175 A | 4/2008 |
| CN | 101166282 A | 4/2008 |
| CN | 101277454 A | 10/2008 |
| CN | 101309412 A | 11/2008 |
| CN | 101312542 A | 11/2008 |
| JP | 2000-152285 A | 5/2000 |
| JP | 2001-346226 A | 12/2001 |
| KR | 10-1999-0057669 A | 7/1999 |
| KR | 10-2007-0001707 A | 1/2007 |
| WO | 2005-114998 A1 | 12/2005 |
| WO | 2007-064159 A1 | 6/2007 |
| WO | 2007/067020 A1 | 6/2007 |
| WO | 2007/067020 A1 | 6/2007 |
| WO | WO 2007/064159 * | 6/2007 |
| WO | 2007-113725 A2 | 10/2007 |

OTHER PUBLICATIONS

Tam W J et al: "Stereoscopic Image Generation Based on Depth Images for 3D TV", IEEE Transactions on Broadcasting, IEEE Service Center, Piscataway, NJ, US, vol. 51, No. 2, Jun. 1, 2005 (Jun. 1, 2005), pp. 191-199, XP011132692, ISSN: 0018-9316, DOI: 10.1109/TBC.2005.846190 *the whole document*.

* cited by examiner

FIG.5

| Syntax | No. of Bits | Format |
|---|---|---|
| terrestrial_virtual_channel_table_section() { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_channels_in_section | 8 | uimsbf |
|   for (i=0; i< num_channels_in_section; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequency | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptors_length | 10 | uimsbf |
|   for (j=0; j<N; j++) { | | |
|     additional_descriptor() | | |
|   } | | |
|   CRC_32 | 32 | rpchof |
| } | | | descriptor() → INTRINSIC CAMERA PARAMETER DESCRIPTOR followed by EXTRINSIC CAMERA PARAMETER DESCRIPTOR

FIG.6

| X | s | E | N |
|---|---|---|---|
| focal_length_x | sign_focal_length_x | exponent_focal_length_x | mantissa_focal_length_x |
| focal_length_y | sign_focal_length_y | exponent_focal_length_y | mantissa_focal_length_y |
| principal_point_x | sign_principal_point_x | exponent_principal_point_x | mantissa_principal_point_x |
| principal_point_y | sign_principal_point_y | exponent_principal_point_y | mantissa_principal_point_y |
| skew_factor | sign_skew_factor | exponent_skew_factor | mantissa_skew_factor |
| r[i][j][k] | sign_r[i][j][k] | exponent_r[i][j][k] | mantissa_r[i][j][k] |
| t[i][j] | sign_t[i][j] | exponent_t[i][j] | mantissa_t[i][j] |

FIG.7

| Syntax | No. of bits | Format |
|---|---|---|
| intrinsic_camera_parameter_descriptor ( ) { | | |
| descriptor_tag | 8 | 0xTBD |
| descriptor_length | 8 | uimsbf |
| parameter_id | 8 | uimsbf |
| reserved | 3 | '111' |
| elementary_PID | 13 | uimsbf |
| reserved | 1 | '1' |
| prec_focal_length | 5 | uimsbf |
| prec_principal_point | 5 | uimsbf |
| prec_skew_factor | 5 | uimsbf |
| reserved | 3 | '111' |
| sign_focal_length_x | 1 | bslbf |
| exponent_focal_length_x | 6 | uimsbf |
| mantissa_focal_length_x | 6 | uimsbf |
| reserved | 3 | '111' |
| sign_focal_length_y | 1 | bslbf |
| exponent_focal_length_y | 6 | uimsbf |
| mantissa_focal_length_y | 6 | uimsbf |
| reserved | 3 | '111' |
| sign_principal_point_x | 1 | bslbf |
| exponent_principal_point_x | 6 | uimsbf |
| mantissa_principal_point_x | 6 | uimsbf |
| reserved | 3 | '111' |
| sign_principal_point_y | 1 | bslbf |
| exponent_principal_point_y | 6 | uimsbf |
| mantissa_principal_point_y | 6 | uimsbf |
| reserved | 3 | '111' |
| sign_skew_factor | 1 | bslbf |
| exponent_skew_factor | 6 | uimsbf |
| mantissa_skew_factor | 6 | uimsbf |
| } | | |

FIG.8

| Syntax | No. of bits | Format |
|---|---|---|
| extrinsic_camera_parameter_descriptor ( ) { | | |
| descriptor_tag | 8 | 0xTBD |
| descriptor_length | 8 | uimsbf |
| reserved | 4 | '1111' |
| num_cameras_minus1 | 10 | uimsbf |
| prec_rotation_param | 5 | uimsbf |
| prec_translation_param | 5 | uimsbf |
| for( i=0; i<=num_cameras_minus1; i++ ) { | | |
| camera_id | 8 | uimsbf |
| ref_parameter_id | 8 | uimsbf |
| priority_id | 8 | uimsbf |
| reserved | 2 | '11' |
| stream_available | 1 | bslbf |
| if (stream_available=='1') { | | |
| elementary_PID | 13 | uimsbf |
| } | | |
| else { | | |
| reserved | 13 | '1111111111111' |
| } | | |
| for( j=0; j<3; j++ ) { | | |
| for( k=0; k<3; k++ ) { | | |
| reserved | 3 | '111' |
| sign_r[i][j][k] | 1 | bslbf |
| exponent_r[i][j][k] | 6 | uimsbf |
| mantissa_r[i][j][k] | 6 | uimsbf |
| } | | |
| reserved | 3 | '111' |
| sign_t[i][j] | 1 | bslbf |
| exponent_t[i][j] | 6 | uimsbf |
| mantissa_t[i][j] | 6 | uimsbf |
| } | | |
| } | | |
| } | | |

METHOD FOR 3D IMAGE SIGNAL PROCESSING AND IMAGE DISPLAY FOR IMPLEMENTING THE SAME

This application claims the benefit of priority of U.S. Provisional Application No. 61/138,941 filed on Dec. 18, 2008 and PCT Application No. PCT/KR2009/004620 filed on Aug. 19, 2009, all of which are incorporated by reference in their entirety herein.

TECHNICAL FIELD

The present invention relates to a display device and an image display method and, more particularly, to a display device for displaying 3D images and an image display method thereof.

BACKGROUND ART

The advancement of television techniques has reached a level of implementing a device for displaying stereoscopic images. Various stereoscopic image display schemes have been proposed, and at the time when the present application, full-fledged commercialization of a stereoscopic type 3D television is at hand. In a stereoscopic 3D system, two images are captured by using two image sensors, which are separated from each other by about 65 millimeters, similar to human eyes, and the captured images are transmitted as a broadcast signal to a receiver. Then, the receiver processes the two images to be input to left and right eyes of a viewer (i.e., a user), thereby simulating binocular disparity to allow for depth perception and stereoscopic vision.

In addition, active research is being conducted with respect to multi-view video, in which a plurality of images is captured through several cameras and the captured images are provided to a receiver such that 3D images of various views can be displayed on the receiver. Multi-view video is anticipated to give the advantages of providing three-dimensional (3D) image effects via a wide screen and viewpoint freedom.

However, in commercially implementing the multi-view video, the amount of instantly processed data is increased at the transmission side and the reception side, and high-priced equipment is required. In particular, in order to transmit images having different viewpoints, considerable bandwidth is required for a transmission process no matter how heavily signals are compressed by removing temporal redundancy and spatial redundancy. Although cable networks or satellite broadcast networks have been extended, a considerable number of receivers at the time of filing the present application will still receive television signals via the air interface, and coding a plurality of images and transmitting the coded images through a bandwidth allocated to respective broadcast channels for radio signals are not considered to be easy.

Such a problem may arise with a system transmitting two image signals for a stereoscopic 3D display besides the multi-view video.

Thus, a method for significantly reducing the amount of image signal information in transferring information regarding a plurality of image signals to a receiver to implement a stereoscopic 3D display or a multi-view video is urgently required.

DISCLOSURE OF THE INVENTION

Therefore, an object of the present invention is to provide a method for processing a 3D image signal whereby although an image signal transmission side transmits information to be included in a plurality of image signals, while omitting a portion of the information, a receiver can synthesize the transmitted information to reproduce an image.

Another object of the present invention provides an image display device for implementing the image signal processing method.

A 3D image signal processing method according to an exemplary embodiment of the present invention is implemented in a 3D image display device. The 3D image display device restores at least one image from a broadcast signal, additionally generates an image at a virtual camera view from the restored image, and displays it three-dimensionally. To this end, the image display device first receives a broadcast signal and parses it to extract signaling information, and obtains at least one set of camera parameters from the signaling information. And then, the image display device generates a virtual view image according to the camera parameters, and formats the virtual view image and the broadcast image included in the broadcast signal.

The signaling information may be a terrestrial virtual channel table (TVCT) or a program map table (PMT).

In an exemplary embodiment, the broadcast signal may include depth information.

In the exemplary embodiment, in generating the virtual view image, first, depth information at a virtual view viewpoint may be generated according to the camera parameters and the depth information. And then, the virtual view image at the virtual view viewpoint may be generated according to the broadcast image and the virtual view viewpoint. In an exemplary embodiment, the virtual view viewpoint may be designated by the signaling information. In a modification, the virtual view viewpoint may be designated or changed according to a user command.

In the exemplary embodiment, the broadcast signal may include a plurality of images and the depth information related to one of the plurality of images. In this case, the image related to the depth information among the plurality of images may be determined as a basic image, and the virtual view viewpoint may be generated on the basis of the determined basic image, the depth information, and the camera parameter.

Form information of an object may be additionally included in the broadcast signal. In this case, the virtual view viewpoint may be generated according to the camera parameters and the form information. The form information may include occlusion information by a different object.

According to an aspect of the present invention, there is provided an image display device including a broadcast signal receiving unit, a rendering unit, and a formatter. The broadcast signal receiving unit may receive a broadcast signal and parse it to extract signaling information, and obtain at least one set of camera parameters from the signaling information. The rendering unit may generate a virtual view image according to the camera parameters. The formatter may format the virtual view image and the broadcast image included in the broadcast signal three dimensionally.

According to exemplary embodiments of the present invention, in implementing a 3D display using a stereoscopic 3D image or a multi-view image captured in different directions by using a plurality of cameras, a syntax and a data structure for signaling a camera parameter to a receiver are defined. Since the receiver can synthesize a 3D scene at a virtual view by using depth information obtained by using a depth camera and the camera parameter, although an acquisition end has acquired an image even from a view whose image has not been clearly transmitted, or for a view intended to be synthesized by a reception end, a receiver can generated 3D content.

Sufficient information required for rendering in a 3D display process may be transmitted while reducing a transmission bandwidth by omitting a transmission of a portion of a camera image, and the receiver can simply process signals for a 3D display by utilizing the transmitted image and information.

The foregoing and other objects, features, aspects and advantages of the present invention will become more apparent from the following detailed description considered in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 shows a syntax configuration of a terrestrial virtual channel table (TVCT) to which the camera parameter is inserted according to an exemplary embodiment of the present invention;

FIG. 6 is a table showing the relationships between camera parameters and syntax elements according to a floating point number display scheme;

FIG. 7 shows a syntax configuration of intrinsic camera parameter descriptors according to an exemplary embodiment of the present invention;

FIG. 8 shows a syntax configuration of extrinsic camera parameter descriptors according to an exemplary embodiment of the present invention;

MODES FOR CARRYING OUT THE PREFERRED EMBODIMENTS

Reference will now be made in detail to the preferred embodiments of the present invention, examples of which are illustrated in the accompanying drawings.

Figure 1:
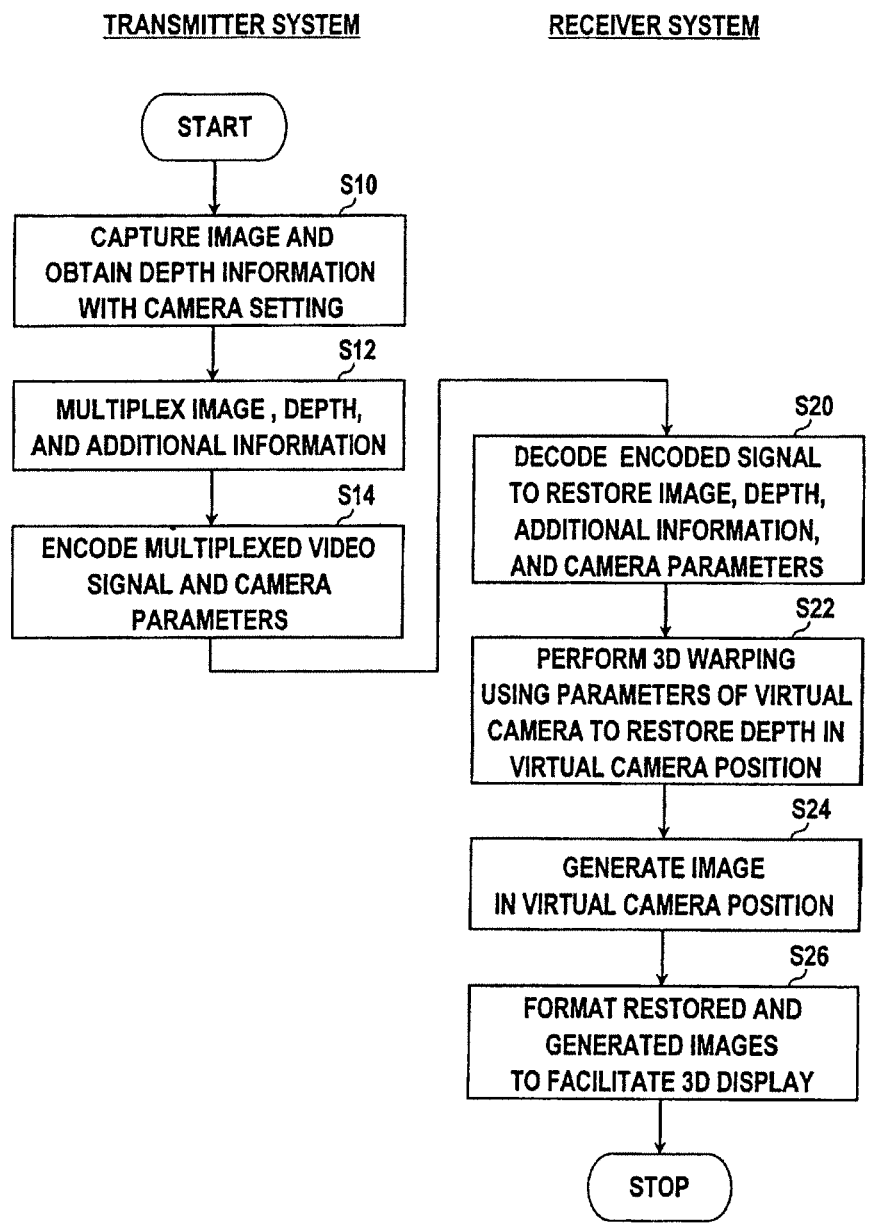
FIG. 1 is a flow chart illustrating the process of transmitting an image signal including a camera parameter by a transmission system and generating and restoring an image on the basis of the camera parameter by a reception system.

The process of transmitting an image signal including camera parameters by a transmission system and generating and restoring an image on the basis of the camera parameters in a reception system according to an exemplary embodiment of the present invention will now be described with reference to FIG. 1.

The transmission system captures an image by using a plurality of cameras, e.g., a pair of stereoscopic cameras (step S10). At least one of the plurality of cameras is a real camera, and the other camera(s) may be a virtual camera(s). Here, the real camera refers to a camera transmitting a stream of a captured image to a reception side. The virtual camera refers to a camera whose image stream is not transmitted but a camera parameter thereof is transmitted to the reception system so that the reception system can restore the corresponding stream (to be described). The virtual camera may not exist in actuality and the camera parameter (to be described) of the virtual camera may be determined by broadcast producers or engineers.

Meanwhile, depth cameras for obtaining depth (or range) information with respect to each main view included in an image are disposed such that they correspond to the actual cameras, so that the transmission system can obtain depth information in conjunction with the image. In addition, the transmission system extracts additional information to be transmitted to the reception system from the image captured by the camera. The additional information may include information for estimating a portion of an object, which is covered by and thus cannot be seen due to another object located in front thereof. For example, the additional information may include geometrical information such as an object outline, or the like, object transparency information, color information, and the like. In an exemplary embodiment, the additional information is obtained from an image captured by the real camera. However, as a modification, the additional information may be obtained from an image captured by a virtual camera or from a combination of the real camera image and the virtual camera image. The depth information and/or additional information are not essential but may be selectively extracted and transmitted so as to help generate a virtual image in the reception system.

In step S12, the transmission system multiplexes the image signal into a form that the images, the depth information, and the additional information are combined. Subsequently, the transmission system codes the multiplexed image signal and the camera parameter and transmits the same to the reception system (step S14).

When the coded image signal is received, the reception system decodes it to restore the image, the depth information, the additional information, and the camera parameters (step S20). Thereafter, the reception system generates depth information at a virtual camera position by using the camera parameters of the virtual camera (step S22). Subsequently, the reception system performs 3D warping to generate an image at the virtual camera position (step S24). Finally, the reception system formats the image restored in a decoding process and the generated image according to a display scheme of the corresponding receiver to thus display a 3D image (step S26).

Figure 2:
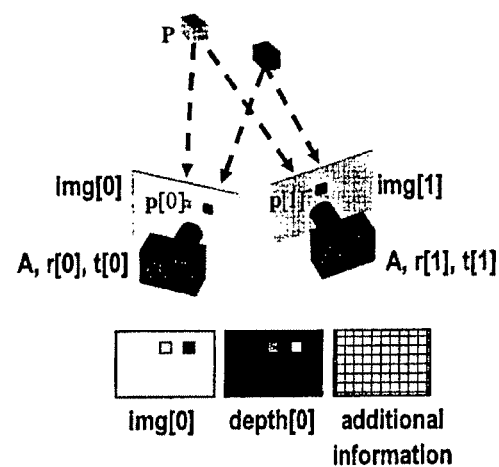
FIG. 2 shows image information, depth information, and additional information coded by the transmission system illustrated in FIG. 1.

An example of the process of transmitting the coded image information, depth information, and additional information by the transmission system and decoding the image information, depth information and additional information by the reception system to generate and restore an image on the basis of the decoded information will now be described. FIG. 2 illustrates one real camera and one virtual camera. However, FIG. 2 is merely illustrative and a greater number of real cameras and virtual cameras may be provided.

In FIG. 2, an image captured by the real camera will be denoted as img[0] and an image captured by the virtual camera will be denoted as img[1]. A point on the image img[0] corresponding to a point (P) in the 3D real world will be denoted as p[0], and a point on the image img[1]

corresponding to the point (P) will be denoted as p[1]. Meanwhile, camera parameters are extracted with respect to the respective cameras. The camera parameters are classified into intrinsic camera parameters and extrinsic camera parameters. The intrinsic camera parameters exhibit the characteristics of the camera itself such as optical characteristics including a focal length and a principal point, and a skew factor, or the like, of a camera lens. The extrinsic camera parameters indicate a geometrical position and direction of the real camera or the virtual camera, including a translation, the amount of rotation, or the like, of a reference coordinate system of each camera with respect to a reference coordinate system of the real world. In FIG. 2, an intrinsic parameter with respect to the first camera, i.e., the real camera, is indicated as 'A'. When it is assumed that the second camera, i.e., the virtual camera, is the same type of camera as that of the first camera and sufficiently calibrated with the first camera, the intrinsic parameter of the second camera will also be 'A', like the first camera. Meanwhile, it is assumed that the amount of rotation of the first camera is r[0] and the translation is t[0]. It is assumed that the amount of rotation of the second camera is r[1] and translation is t[1].

According to an exemplary embodiment of the present invention, both the image and depth information with respect to all the real cameras are transmitted to the reception system. The additional information is created on the basis of one image and transmitted to the reception system. Thus, in the example illustrated in FIG. 2 in which one real camera and one virtual camera are provided, the image img[0] and the depth information depth[0] are transmitted to the reception system, and the additional information is also transmitted in order for the reception system to use it in generating the image img[1] and the depth information depth [1].

Figure 3:
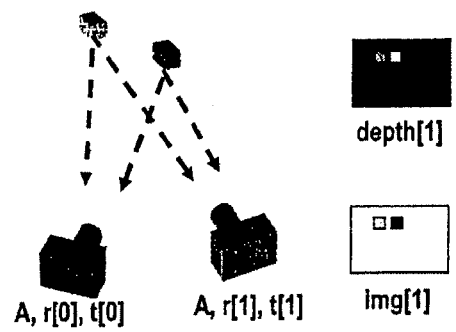
FIG. 3 shows an image generated and restored by the reception system on the basis of the image information, depth information, and additional information.

The reception system decodes the coded image signal to restore the image img[0], the depth information depth [0], and the additional information with respect to the first camera, the real camera. In addition, the reception system restores the camera parameters A, r[0], t[0], r[1], and t[1] with respect to all the cameras. With reference to FIG. 3, the reception system generates the depth information depth[1] at the position of the second camera by using the camera parameters A, r[0], t[0], r[1], and t[1] and the image img[0], the depth information depth[0], and the additional information with respect to the first camera. Subsequently, the reception system generates the image img[1] at the position of the second virtual camera by performing 3D warping. As the image img[1] at the position of the second camera is secured in addition to the image img[0] captured by the first camera, the reception system can format the two images, namely, the real image img[0] and the virtual image img[1] to display a 3D image. For example, the reception system sets one of the real image and the virtual image as a left image and the other image as a right image and displays them in a stereoscopic manner according to a 3D format.

Figure 4:
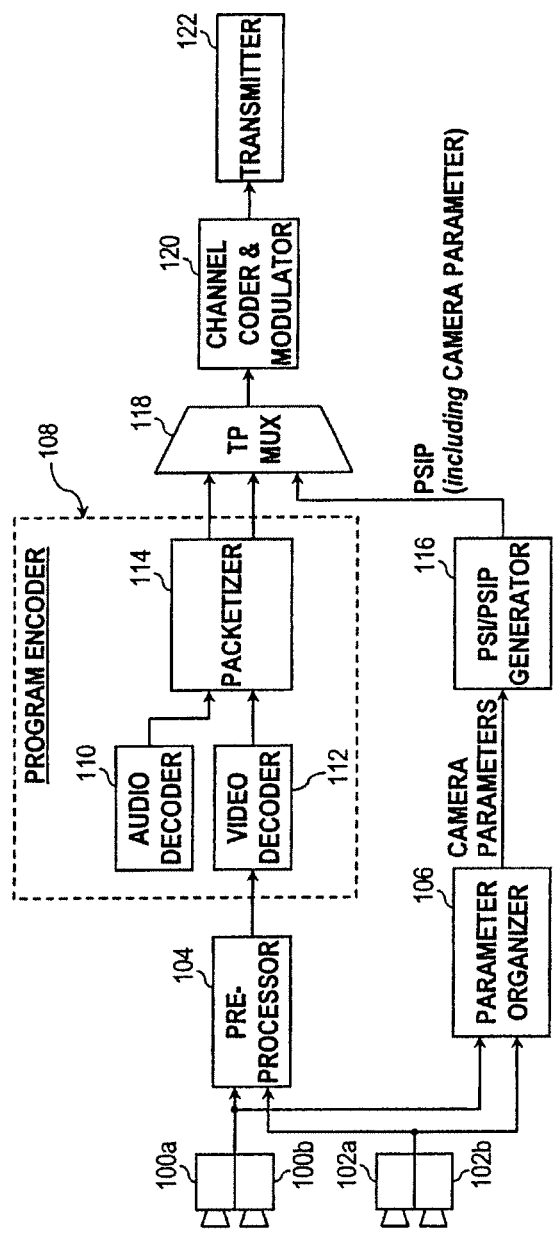
FIG. 4 is a schematic block diagram of a system for producing and transmitting a broadcast program according to an exemplary embodiment of the present invention.

FIG. 4 is a schematic block diagram of a system for producing and transmitting a broadcast program according to an exemplary embodiment of the present invention. The system for producing and transmitting a broadcast program according to the present exemplary embodiment includes a plurality of cameras 100a and 102a, depth cameras 110b and 102b provided to respectively correspond to the plurality of cameras 100a and 102a, a preprocessor 104, a camera parameter organizer 106, a program encoder 108, a PSI/PSIP generator 116, a transport multiplexer, a channel coder and modulator 120, and a transmitter 122.

The respective cameras 100a and 102a include a lens and an image pickup element disposed to correspond to the lens, and capture an image of a scene. In an exemplary embodiment, lenses of the two cameras 100a and 102a are disposed to be separated by 65 millimeters from each other like human eyes, and accordingly, the cameras 100a and 102a obtain two 2D images having binocular disparity. However, the present invention is not limited to the implementation of two cameras for capturing images excluding the depth camera, and a plurality of cameras including the virtual camera may be provided to capture a plurality of images to implement a multi-view image as mentioned above.

The preprocessor 104 cancels noise which may be present in the images captured by the cameras 100a, 100b, 102a, and 102b, calibrates images, and solves an imbalancing phenomenon of luminance components. Images, which have been preprocessed by the preprocessing unit 104, may be stored in a storage unit or edited, and thus, as a matter of course, there may be a considerable time difference between the capturing by the cameras 100a, 100b, 102a, and 102b and coding by the program encoder 108.

The camera parameter organizer 106 obtains camera parameters with respect to the cameras 100a and 102a. In an exemplary embodiment, the camera parameter organizer 106 receives intrinsic parameters such as the focal length, the principal point, a skew factor, or the like, of the camera lens with respect to each of the cameras 100a and 102a, and the extrinsic parameters such as the translation, the amount of rotation, or the like, from each of the cameras 100a and 102a. As a modification, the camera parameter organizer 106 may receive the intrinsic camera parameters and the extrinsic camera parameters from a mechanical device or a computer program used for setting cameras at an image-capturing site. The camera parameter organizer 106 provides the camera parameters to the PSI/PSIP generator 116 according to a predetermined format, so that the PSI/PSIP generator 116 can include the camera parameters in a PSIP.

In the program encoder 108, an audio coder 110 receives voice signals from a plurality of microphones (not shown) installed at appropriate locations in an image capture scene, codes them according to a predetermined standard, e.g., the AC-3 standard, to generate an audio elementary stream (ES).

An video coder 112 codes the images captured by the cameras 110a and 102a and the depth information captured by the cameras 100b and 102b according to a certain standard, and removes temporal and spatial redundancy to generate a video elementary stream (ES). In addition, the video coder 112 generates additional information by using the image captured by the real camera 100a and/or the image captured by the virtual camera 102a and codes the generated additional information. As mentioned above, the additional information includes information for estimating an occlusion (i.e., a portion which is covered and unseen due to an object in front thereof), such as geometrical information including an object outline, or the like, object transparency information, color information, or the like.

Preferably, the video coder 112 codes the captured image, the depth information, and the additional information, separately, to generate separate streams. In an exemplary embodiment, the video coder 112 codes the image, the depth information, and the additional information according to the MPEG-2 standard of ISO/IEC 13818-2 and the ATSC digital television standard of A/53 Part 4. However, the present invention is not limited thereto, and the video coder 110 may code the image according to H.264/AVC standard drafted by the Joint Video Team (JVT) of ISO/IEC JTC1/SC29/WG11 and ITU-T SG16 Q.6, or any other schemes.

A packetizer 114 receives the audio ES and the video ES from the audio coder 110 and the video coder 112, respectively, and packetizes the respective streams to generate packetized elementary streams.

The PSI/PSIP generator 116 generates program specification information (PSI) and program and system information protocol (PSIP) data. In particular, in an exemplary embodiment of the present invention, the PSI/PSIP generator 116 receives the camera parameters from the camera parameter organizer 106 and includes it in the PSIP. In an exemplary embodiment, the camera parameters are inserted into a terrestrial virtual channel table (TVCT). However, the present invention is not limited thereto and the camera parameters may be inserted to the PMT or any other tables.

The transport multiplexer 118 multiplexers the PES and the PSI/PSIP information and adds a header thereto to generate a transport stream (TS). In particular, in the present exemplary embodiment, in the PSIP data multiplexed with the PES by the transport multiplexer 118, the camera parameters are described in the TVCT. Meanwhile, in the system illustrated in FIG. 4, one channel is transmitted via ground (terrestrial) waves, but, for example, a system for transmitting a broadcast signal through a cable network or a satellite network may additionally includes a transmission multiplexer for multiplexing broadcast signals of a plurality of channels to generate a multi-program TS.

The channel coder and modulator 120 perform error-correction coding on the TS such that a receiver can detect and correct an error which may be caused by noise in a transport channel. In addition, the channel coder and modulator 120 modulates the error-correction coded TS according to a modulation scheme, e.g., an 8-VSB modulation scheme, adopted by the system. The transmitter 122 transmits the modulated broadcast signal according to channel characteristics, e.g., through an antenna.

The method for transmitting the camera parameters by the system illustrated in FIG. 4 will now be described with reference to FIGS. 5 to 8. As mentioned above, in an exemplary embodiment, the camera parameters may be described in the form of a descriptor in the TVCT within the PSIP.

FIG. 5 shows the syntax configuration of the TVCT including descriptors of the camera parameters according to an exemplary embodiment of the present invention. The TVCT may have descriptors in order to deliver information regarding a virtual channel and expand the information. The camera parameters according to the present exemplary embodiment may constitute one of the descriptors of the TVCT. In detail, a plurality of tables each having a particular purpose are defined in the PSIP, and each of the plurality of tables have a section structure similar to that of the tables defined in the PSI (Program Specific Information) of MPEG. Namely, each table is configured to have the structure of a section for transmission, and may include one or a plurality of sections according to its type.

Each section may be divided into a header including basic information of the tables and sections, a body including actual data of tables, and a trailer including information for an error correction, in order to allow the reception system to selectively receive a section. In describing the TVCT section illustrated in FIG. 5, the TVCT section will be described by discriminating the header from a 'table_id' field to a 'protocol_vision' field, a body from a 'num_channels_in_section' field to an 'additional_descriptors_length' field, and a trailer including a 'CRC_32' field.

First, the 'table_id' field in the header indicates a table type in the PSIP. In case of the TVCT, the 'table_id' field is determined to have a field value of 8 bits of "0xC8" according to the MPEG, ATSC, ARIB, SCTE, or DVB standard. A 'section_syntax_indicator' field indicates a format of the table section, and in case of an ATSC PSIP table, the 'section_syntax_indicator' field is determined to have a value of 1 according to, for example, ISO/IEC 13818-1, Table 2-30. A 'private_indicator' field indicates the number of bytes remaining in this section from this field to the last of the table section. A 'transport_stream_id' indicates a TS identifier of a transport stream. A 'version_number' field indicates a version number of the table section, and a 'current_next_indicator' field indicates whether or not the table section follows a current version or a next version. A 'section_number' field indicates a serial number of the table section, and a 'last_section_number' indicates a serial number of a previous table section. A 'protocol_version' field indicates a protocol version.

In the body part, a 'num_channels_in_section' field indicates the number of virtual channels defined to follow the table section. The part from a 'short_name' to descriptor( ) indication field in a 'for' loop is repeatedly described for each virtual channel.

The 'short_name' field allows for assigning a short name formed as a Unicode with respect to a virtual channel. A 'major_channel_number' field and a 'minor_channel_number' field are combined to indicate a virtual channel number. A 'modulation_mode' field indicates a modulation mode used to transmit an individual channel, and a 'carrier frequency' field indicates a carrier frequency. A 'channel_TSID' field indicates a transport stream ID of a channel including a program referred to by a virtual channel. A 'program_number' field allows for uniquely identifying each program service existing in a transport stream.

An 'ETM_location' field indicates whether or not an extended event table is present.' An 'access_controlled" field indicates whether or not a corresponding virtual channel is accessed and controlled. A 'hidden' field indicates whether or not a virtual channel can be directly inputted to access a corresponding channel or whether or not a channel is hidden such that it will not be displayed when inputting a channel number or when surfing. A 'hide_guide' field indicates whether or not a corresponding channel or a relevant event with respect to a hidden channel appears on an EPG display. A 'service_type' field indicates a service type set in a virtual channel. A 'source_id' field indicates whether or not linking between virtual channels, the content entered into the event information table, and whether linking between extended event text tables is allowed, which may indicate a programming source related to a virtual channel.

A 'descriptors_length' field indicates the overall byte length of a descriptor field below this field, and the descriptor( ) portion is where an individual descriptor is described. A different descriptor loop may be included by using additional_descriptors_length and additional_descriptor( ) fields.

At the trailer part, 'CRC_32' field indicates CRC data calculated according to a polynomial operation with respect to each byte from the 'table_id' field to the last byte of the table, thus allowing the receiver to detect an error.

In an exemplary embodiment of the present invention, the camera parameters may be described and defined in order of the intrinsic parameter descriptor and an extrinsic parameter descriptor at the 'descriptor( )' portion in the TVCT table as described above. The intrinsic camera parameter may be described at the 'descriptor( )' portion and the extrinsic camera parameter may be described at the 'additional_descriptor( )' portion.

In an exemplary embodiment, it is assumed that the intrinsic camera parameter is calibrated, and one intrinsic camera parameter descriptor commonly applied to every camera is delivered to the reception system. However, as a modification, an individual intrinsic camera parameter descriptor with respect to each camera may be delivered to the reception system.

In an exemplary embodiment, the intrinsic camera parameter includes a focal length, a principal point, and a skew factor. The focal length is divided into a horizontal focal length (focal_length_x) and a vertical focal length (focal_length_y) and described. Similarly, the principal position is divided into a horizontal principal point (a principal_point_x) and a vertical principal point (a principal_point_y). Each parameter is expressed according to a floating point number display scheme according to the IEC 60550:1989 through IEEE 954-1985 standards and divided into a sign, an index portion, a valid digit mantissa portion and displayed. In an exemplary embodiment, the sign is indicated by an 1-bit integer, and the index portion and the valid digit mantissa portion is indicated by a 6-bit integer. In particular, in order to indicate a negative number, the index portion is indicated in the form of a biased exponent form of excess-31 code. FIG. 6 is a table showing the relationships between the camera parameters and the syntax elements according to a floating point number display scheme.

The foregoing intrinsic parameters constitute an intrinsic parameter matrix as expressed by the Equation shown below:

$$A = \begin{bmatrix} focal\_length\_x & skew\_factor & principal\_point\_x \\ focal\_length\_y & 0 & principal\_point\_y \\ 0 & 0 & 1 \end{bmatrix} \quad [\text{Equation 1}]$$

Meanwhile, extrinsic camera parameters separately defined for respective cameras including the real camera and the virtual camera may be expressed by a rotation matrix and a displacement matrix as expressed by Equation 2 shown below. Here, i indicates a parameter with respect to i-th camera.

$$r[i] = \begin{bmatrix} r[i][0][0] & r[i][0][1] & r[i][0][2] \\ r[i][1][0] & r[i][1][1] & r[i][1][2] \\ r[i][2][0] & r[i][2][1] & r[i][2][2] \end{bmatrix} \quad [\text{Equation 2}]$$

$$t[i] = \begin{bmatrix} t[i][0] \\ t[i][1] \\ t[i][2] \end{bmatrix}$$

Respective components of the rotation matrix and the displacement matrix are also divided into a sign, an exponent portion, a valid digital mantissa portion.

FIG. 7 shows a syntax configuration of the intrinsic camera parameter descriptors according to an exemplary embodiment of the present invention.

A 'descriptor_tag' field serves as an ID of a descriptor. One of the empty values in the ATSC A/65 standard may be assigned in order to indicate that the descriptor is an intrinsic camera parameter. A 'descriptor_length' field indicates information regarding the number of bytes included in the descriptor. A 'parameter_id' field indicates an identifier of a parameter descriptor. An 'elementary_PID' field indicates a PID value with respect to a video ES to which a corresponding parameter is applied. In general, according to the ATSC N65 standard, a packet identifier (PID), i.e., an elementary PID, with respect to an audio ES and a video ES is described through a service location descriptor (SLD). The PID of the video ES related to a corresponding parameter may be written in the 'elementary_PID' field included in the intrinsic camera parameter descriptor in FIG. 7 to indicate which of the video ESs that the corresponding parameter is related to, thus allowing the reception side to recognize the connection relationship between the camera parameter and the video ES.

A 'prec_focal_length' field indicates an exponent portion of a maximum allowable truncation error with respect to the focal length (focal_length_x, focal_length_y). Here, the maximum allowable truncation error with respect to the focal length is $2^{-prec\_focal\_length}$. A 'prec_principal_point' field indicates an exponent portion of the maximum allowable truncation error with respect to the principal point (principal_point_x, principal_point_y), and here, the maximum allowable truncation error with respect to the principal point is $2^{-prec\_principal\_point}$. A 'prec_skew_factor' field indicates an exponent portion of the maximum allowable truncation error with respect to a skew coefficient, and here the maximum allowable truncation error with respect to the skew coefficient is $2^{-prec\_skew\_factor}$.

A "sign_focal_length_x" field is a 1-bit value indicating a sign of the horizontal focal length of a camera. When the field value is 0, it indicates that the sign is a positive number, and when the field value is 1, it indicates that the sign is a negative number. An 'exponent focal_length_x' is a 6-bit value indicating an exponent portion of the horizontal focal length, having a value ranging from 0 to 62. A 'mantissa_focal_length_x' field is a value indicating a valid digit mantissa portion of the horizontal focal length and has a variable bit length within 6 bits, and here the bit length is determined as follows.

When exponent_focal_x=0, length=maximum value(0,prec_focal_length−30)

When exponent_focal_length_x is greater than 0 and smaller than 63, length=maximum value(0, exponent_focal_length_x+prec_focal_length−31)

Similarly, a 'sign_focal_length_y' field is 1-bit value indicating the sign of a vertical focal length. When the field value is 0, it indicates that the sign is a positive number, and when the field value is 1, it indicates that the sign is a negative number. An 'exponent_focal_length_y' field is a 6-bit value indicating an exponent portion of the vertical focal length, and may have a value ranging from 0 to 62. A 'mantissa_focal_length_y' field is a value indicating a valid digit mantissa portion of the vertical focal length, has a variable bit length within 6 bits, and the bit length is determined as follows.

When exponent_focal_length_y=0, length=maximum(0, prec_focal_length−30)

When exponent_focal_length_y is greater than 0 and smaller than 63, length=maximum value(0, exponent_focal_length_y+prec_focal_length−31)

Similarly, 'sign_principal_point_x' is a 1-bit value indicating the sign of a vertical principal point. When the field value is 0, it indicates that the sign is a positive number, and when the field value is 1, it indicates that the signal is a negative number. An 'exponent_principal_point_y) is a 6-bit value indicating an exponent portion of the vertical principal point and may have a value ranging from 0 to 62. A 'mantissa_principal_point_x' is a value indicating a valid digital mantissa portion of the vertical principal point, has a variable bit length within 6 bits, and the bit length is determined as follows.

When exponent_principal_point_x=0, length=maximum value(0, prec_principal_point−30)

When exponent_principal_point_x is greater than 0 and smaller than 63, length=maximum value(0, exponent_principal_point_x+prec_principal_point−31)

In this manner, according to an exemplary embodiment of the present invention, on the assumption that all the cameras are calibrated to have the same characteristics, the intrinsic camera parameter descriptor commonly applied to all the cameras is delivered to the reception system. However, as a modification, some of the cameras may have different characteristics and the intrinsic camera parameter descriptor may be separately delivered to the receiver with respect to each camera.

FIG. 8 shows the syntax configuration of extrinsic camera parameter descriptors according to an exemplary embodiment of the present invention. As illustrated, one extrinsic camera descriptor is described to individually include setting information regarding all the cameras. The cameras include at least one real camera for transmitting a real image, and the other remaining cameras may be virtual cameras of a new viewpoint which do not transmit a real image but an image can be generated and restored at the receiver.

In detail, the extrinsic camera parameter descriptor includes a 'descriptor_tag' field, a 'descriptor_length' field, a 'num_cameras_minus1' field, a 'precision_rotation_param' field, and a 'prec_translation_param' field.

The 'descriptor_tag' field serves as an ID of a descriptor. One of the empty values in the ATSC A/65 is allocated to the field in order to indicate that this descriptor is an extrinsic camera parameter. The 'descriptor_length' field indicates information regarding the number of bytes included in the descriptor.

The 'num_cameras_minus1' field indicates the number obtained by subtracting 1 from the total number of the real cameras and virtual cameras as subjects to which the camera parameters are transmitted. The 'precision_rotation' field indicates an exponent portion of a maximum allowable truncation error with respect to rotation matrix components r[i][j][k]. Here, the maximum allowable truncation error is $2^{-prec\_rotation}$. The 'precision_translation' field indicates an exponent portion of a maximum allowable truncation error with respect to displacement matrix components t[i][j][k]. Here, the maximum allowable truncation error is $2^{-prec\_rotation}$.

A descriptor part following the 'camera_id' field is repeatedly described for every camera in the 'for' loop.

The 'camera_id' field is an 8-bit parameter allowing for uniquely identifying a virtual camera, a real camera, or a viewpoint. An 'ref_parameter_id' field indicates a parameter_id of an intrinsic parameter descriptor including an intrinsic parameter with respect to a camera corresponding to the 'camera_id' field. Here, the virtual camera may not have a camera ID according to circumstances, so the 'ref_parameter_id' may not be assigned. In this case, the parameter_id with respect to any one of the real cameras may be indicated at the 'ref_prameter_id' with respect to the virtual camera. The 'priority_id' field indicates the priority of viewpoints to be output in stereoscopic or multi-view broadcasting. A priority value may not be repeated, and a low priority value is low indicates high priority. In case of 2D broadcasting, this field has a value of 0. Meanwhile, in case of stereoscopic broadcasting, streams corresponding to a camera view corresponding to at least priority levels 0 and 1 are provided, and the receiver receives the streams corresponding to the priority levels 0 and 1.

A 'stream_available' field is a flag indicating whether or not a corresponding camera parameter is related to the real camera or the virtual camera. In an exemplary embodiment, a flag value with respect to the virtual camera is 0 and a flag value with respect to the real camera is 1. Also, in the case of the extrinsic camera parameter, like the intrinsic camera parameter, a video ES to which the extrinsic camera parameter is applied may be designated by using the PID value, namely, the 'elementary_PID' field, with respect to the video ES to which the corresponding parameter is applied. Namely, the PID of the video ES related to the corresponding parameter may be written in the 'elementary_PID' field included when a camera is a real camera, i.e., when 'stream_available'=1, in order to indicate to which of video ES the corresponding parameter is related, so that the reception side can recognize the connection relationship between the camera parameter and the video ES.

Subsequently, values with respect to the rotation matrix and displacement matrix with respect to each camera are sequentially expressed. In the rotation matrix r[i] and the displacement matrix t[i], the index I has a value within the range of [0, num_cameras_minus1] and a low I value is assigned to the real camera and the camera having a high priority level.

In the information regarding the rotation matrix, a 'sign_r [i][j][k]' field indicates the sign of a (j,k) component of the rotation matrix of the i-th camera, and when the field value is 0, the sign indicates a positive number, and when the field value is 1, the sign indicates a negative number. An 'exponent_r[i][j][k]' field is a 6-bit value indicating an exponent portion of the (j,k) component of the rotation matrix of the ith camera, and may have a value ranging from 0 to 62. A 'mantissa_r[i][j][k]' field is a value indicating a valid digit mantissa portion of the (j,k) component of the rotation matrix of the ith camera and has a variable bit length within 6 bits, and the bit length is determined as follows.

When exponent_r[i][j][k]=0, length=maximum value(0,prec_rotation−30)

When exponent_r[i][j][k] is greater than 0 and smaller than 63, length=maximum value(0, exponent_*r[i][j][k]*+prec_rotation−31)

In the information regarding the displacement matrix with respect to each camera, a 'sign_t[i][j]' field indicates the signal of a j-th component of the displacement matrix of the i-th camera. When the field value is 0, the sign indicates a positive number, and when the field value is 1, the sign indicates a negative number. An 'exponent_t[i][j]' field is a 6-bit value indicating an exponent portion of the j-th component of the displacement matrix of the i-th camera and may have a value ranging from 0 to 62. A 'mantissa_t[i][j]' field is a value indicating a valid digit mantissa portion of the j-th component of the displacement matrix of the i-th camera and has a variable bit length within 6 bits, and the bit length is determined as follows.

When exponent_t[i][j]=0, length=maximum value(0,prec_translation−30)

When exponent_t[i][j] is greater than 0 and smaller than 63, length=maximum value(0, exponent_$t[i][j]$+pre-c_translation−31)

For example, when a stereoscopic image is obtained through two cameras, the 'num_cameras_minus1' field has a value of 1. When a video image and a depth image at one camera viewpoint among two cameras are transmitted and only a camera parameter with respect to the other camera viewpoint is transmitted, the extrinsic parameter with respect to the real camera is indicated as the rotation matrix r[0] and the displacement matrix t[0] and the extrinsic parameter with respect to the virtual camera is indicated as the rotation matrix r[1] and the displacement matrix t[1]. As described hereinafter, the receiver may generate and restore an image at the virtual camera viewpoint by using the information.

Figure 9:
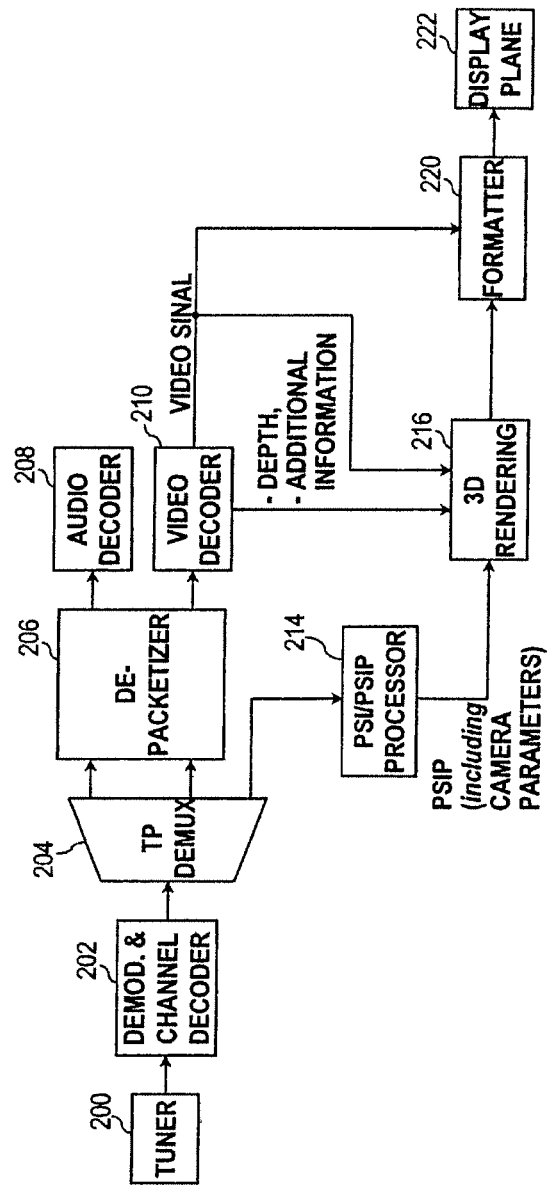
FIG. 9 is a schematic block diagram of a television receiver according to an exemplary embodiment of the present invention.

FIG. 9 is a schematic block diagram of a television receiver according to an exemplary embodiment of the present invention. The television receiver according to the present exemplary embodiment is appropriate for receiving over-the-air (OTA) broadcast signals and reproducing images.

A tuner 200 selects a broadcast signal of any one channel selected by the user from among a plurality of broadcast signals input through an antenna (not shown) and outputs it. A demodulator and channel decoder 202 demodulates the broadcast signal from the tuner 200, performs error-correction-decoding on the demodulated signal, and outputs a transport stream (TS). A transport demultiplexer 204 demultiplexes the TS to separate a video PES and an audio PES, and extracts PSI/PSIP information.

A depacketizer 206 depacketizes the video PES and the audio PES to restore the video ES and the audio ES. An audio decoder 208 decodes the audio ES to output an audio bit stream. The audio bit stream is converted into an analog voice signal by a digital-to-analog converter (not shown), amplified by an amplifier (not shown), and then output through a speaker (not shown). A video decoder 210 decodes the video ES to restore the original image. The audio decoder 208 and the video decoder 210 may perform the decoding process on the basis of a packet ID (PID) ascertained by a PSI/PSIP processor 214 (to be described). In the decoding process, the video decoder 210 extracts the depth information and extracts additional information required for generating an image at the virtual camera viewpoint, namely, information for estimating a portion (occlusion) which is covered by and unseen due to an object in front thereof, e.g., geometrical information such as an object outline, or the like, object transparency information, color information, or the like, and provides the same to a 3D rendering unit 216. However, in a different exemplary embodiment of the present invention, the depth information and/or the additional information may be separated by the transport demultiplexer 204.

The PSI/PSIP processor 214 receives the PSI/PSIP information from the transport demultiplexer 204, parses the received PSI/PSIP information, and stores the parsed information in a memory (not shown) or a register, to thus allow broadcast to be reproduced on the basis of the stored information. In particular, in the present exemplary embodiment, the TVCT of the PSIP received by the receiver includes the camera parameters, and the PSI/PSIP processor 214 extracts the camera parameters and provides the extracted camera parameters to the 3D rendering unit 216.

The 3D rendering unit 216 generates depth information at the virtual camera position by using the restored image, the depth information and the additional information, and the camera parameters. In addition, the 3D rendering unit 216 performs 3D warping on the basis of the restored image and the depth information at the virtual camera position to generate an image at the virtual camera position. A formatter 220 formats the image restored in the decoding process, namely, the image captured by the real camera and the image generated by the 3D rendering unit 216 according to a display scheme of the corresponding receiver, and displays the 3D image through a display plane 222. Here, the generating of the depth information and the image at the virtual camera position by the 3D rendering unit 216 and the image formatting by the formatter 22 may be selectively performed in response to a user command. Namely, the viewer may wish to not display the synthesized image or designate a viewpoint where an image is to be generated by manipulating a remote controller (not shown). When such a manipulation command is applied, a main controller 212 stores the command in the memory and controls generating and displaying of the image with reference to the command.

The process of parsing the intrinsic parameter and the extrinsic parameter and performing rendering in the television receiver illustrated in FIG. 9 will now be described in detail with reference to FIG. 10.

First, the transport demultiplexer 204 demultiplexes the TS from the demodulator and channel decoder 202 to separate the video PES and audio PES and extract the PSI/PSIP information. In this process, the transport demultiplexer 204 filters a TS packet having a packet ID (PID) as '0xFFB'. In general, when the ATSC digital television standard of the A/53 Part 4 is followed, the PID value of "0x1 FFB" is used in other tables, namely, a system time table (SU), a main guide table (MGT), or a rate table (RRT), than the TVCT. Thus, the transport demultiplexer 204 or the PSI/PSIP processor 214 parses the PSIP to additionally obtain section data having "0xC8" as a 'table_id' field value, as the TVCT (step S300).

In step S302, the PSI/PSIP processor 214 identifies descriptor( ) of the currently tuned channel on the basis of the 'major_channel_number' and 'minor_channel_number', parses intrinsic camera parameter and extrinsic camera parameter descriptors of this channel, and stores the camera parameters in the memory.

The camera parameter values can be obtained from the values included in the camera parameter descriptors by Equation 3 shown below:

If $0 < E < 63$, then $X=(-1)^s \cdot 2^{E-31} \cdot (1+n \div 2^v)$

If $E=0$ and $M$ is non-zero, then $X=(-1)^s \cdot 2^{-(30+v)} \cdot n$

If $E=0$ and $M=0$, then $X=(-1)^s \cdot 00$ [Equation 3]

Here, X indicates parameter values such as focal_length_x, focal_length_y, principal_point_x, principal_point_y, skew_factor, r[i][j][k], t[i][j], etc., s, E, and n indicate the sign, the exponent portion, and valid digit mantissa portion, of each parameter delivered through the descriptors as shown in FIG. 6, and v indicates the number of digits of the valid digit mantissa portion.

Figure 10:
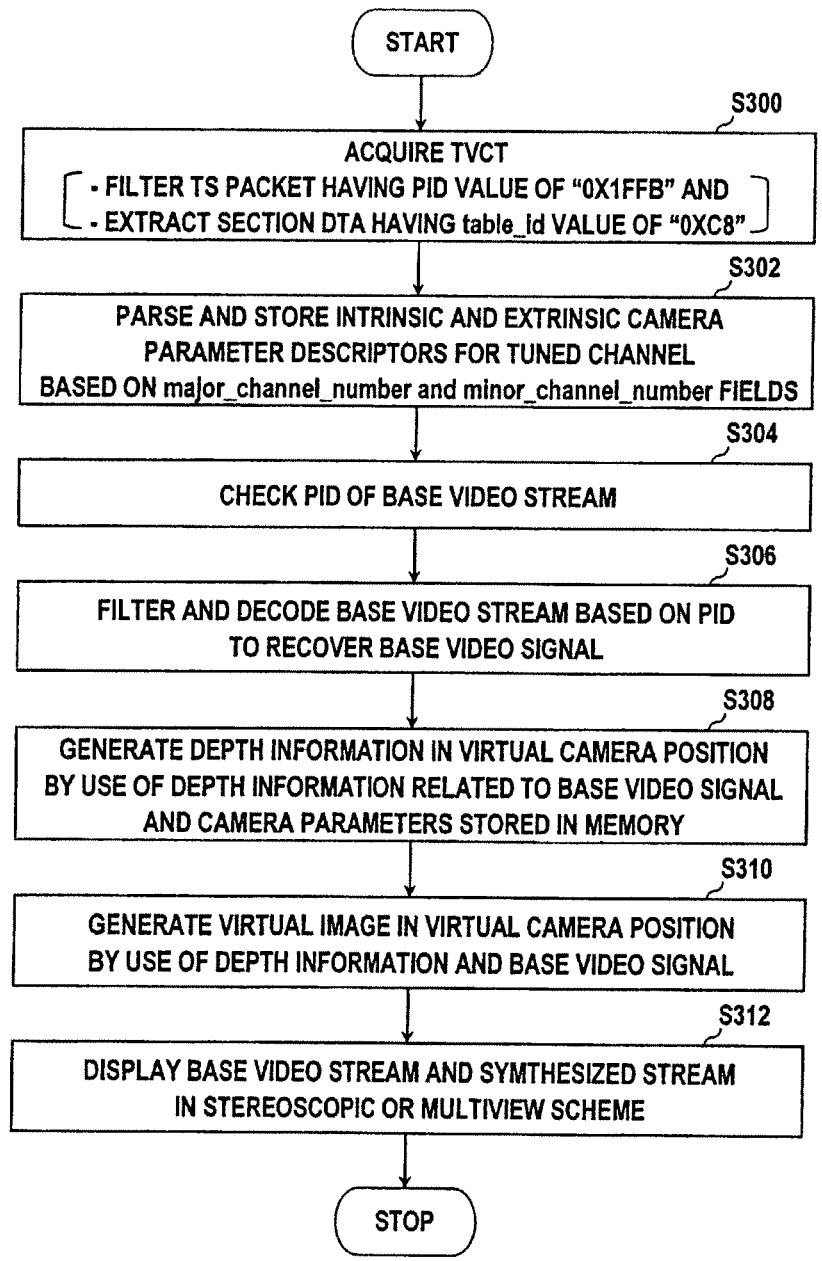
FIG. 10 is a flow chart illustrating the process of parsing and rendering internal and external parameters in the television receiver illustrated in FIG. 9.

With reference to FIG. 10, in step S304, the PID of the base video stream is checked on the basis of the intrinsic camera parameter descriptor in the TVCT. Here, the base video stream refers to a stream which is a base of image generation, in which the parameter regarding the real camera is indicated by the 'stream_available' field. The PID value of the stream can be recognized through the 'elementary_PID'. If there is only one real camera, a stream related to the corresponding camera is a base stream. However, when there are several real cameras, a stream regarding a camera determined according to a certain rule (e.g., a camera adjacent to a virtual camera required to generate an image) may become a base stream. In step S306, the video decoder 210 filters the base video stream on the basis of the PID and decodes it to restore the original image.

In step S308, the 3D rendering unit 216 generates depth information at the virtual camera position by using the depth information related to the restored image and the camera parameters stored in the memory. In this case, as mentioned above, the depth information and/or additional information related to the restored image can be used together.

This will now be described in more detail. A point P in a 3D real space is mapped to a point p[0] in a $0^{th}$ camera image, to a point p[1] in a first camera image, and in general, to a point p[i] in the i-th camera image. A relational expression between the point P in the real space and the point p[i] in the i-th camera image can be expressed by using the camera parameters by Equation 4 shown below:

$$s[i]\begin{bmatrix} p[i] \\ 1 \end{bmatrix} = A[i]I_{34}\begin{bmatrix} r[i] & t[i] \\ 0 & 1 \end{bmatrix}\begin{bmatrix} P \\ 1 \end{bmatrix}$$ [Equation 4]

Here, s[i] is a scaling factor, A[i] is an intrinsic parameter matrix, r[i] is a rotation matrix, t[i] is a displacement matrix, and $I_{34}$ indicates a 3×4 matrix [$I_3$:0] in which a 3×3 identity matrix and 3×1 zero column vector are augmented. In particular, when the overall coordinate axis is taken on the basis of the coordinate axis of the $0^{th}$ camera, the point p[0] in the $0^{th}$ camera image does not have a rotation or movement conversion as shown in Equation 5 below:

$$s[0]\begin{bmatrix} p[0] \\ 1 \end{bmatrix} = A[0]I_{34}\begin{bmatrix} P \\ 1 \end{bmatrix}$$ [Equation 5]

A depth value of a z-axis coordinate value of the point P is z[0], and it is noted that z[0]=s[0] in Equation 5. Namely, the scaling factor is equal to the depth value. Thus, $$P = z[0]A^{-1}[0]\begin{bmatrix} p[0] \\ 1 \end{bmatrix}$$

is induced from Equation 5.

When this value is substituted to Equation 4 and the scaling factor s[i] is replaced by the value z[i], then Equation 6 can be obtained.

$$z[i]\begin{bmatrix} p[i] \\ 1 \end{bmatrix} = z[0]A[i]r[i]A^{-1}[0]\begin{bmatrix} p[0] \\ 1 \end{bmatrix} + A[i]t[i]$$ [Equation 6]

In Equation 6, z[i] indicates a depth value in the i-th camera image. As a result, the depth map in the i-th camera image can be obtained by performing 3D warping on the depth map by using homographic transform, or the like, by using the parameter in the $0^{th}$ camera image as a base image.

With reference to FIG. 10, in step S310, the 3D rendering unit 216 performs 3D warping on the basis of the base video stream and the depth information at the virtual camera position, to thus generate an image at the virtual camera position. The formatter 220 formats the image restored through the decoding process and the image generated by the 3D rendering unit 216 according to a stereoscopic scheme or a multi-view display scheme fitting the display scheme of the receiver, and displays a 3D image on the display plane 222 (step S312).

In this manner, an image can be generated from the camera parameters with respect to a certain virtual camera viewpoint.

The present invention can be modified in various manners and implemented in different embodiments without changing the technical concept or essential characteristics of the present invention.

For example, in the above description, the virtual camera is provided and used in extracting the camera parameters and the additional information, but as a modification, the virtual camera need not be provided. In this case, it is assumed that the intrinsic parameter of the camera parameters is calibrated with the actual camera so as to be considered to be the same as the real camera, the extrinsic parameter is appropriately selected, and the additional information may be extracted by using the image captured by the real camera.

Meanwhile, in the above description, the camera parameters are included in the TVCT and transmitted, but as a modification, the camera parameters may be included in the PMT and transmitted. Such an embodiment can be easily implemented by a skilled person in the art on the basis of the description of the present invention, so a detailed description thereof will be omitted.

Also, in the above description, the real camera image and the image generated on the basis of the camera parameters are mixed to be displayed, but in a different exemplary embodiment, an image generated through graphics or animation tools may be combined with a real image captured by the camera and displayed.

Also, in the above description, the camera parameters with respect to the virtual camera is accepted based on which the image at the virtual camera viewpoint is generated, but as a modification, certain view information designated by the user may be accepted, and a camera parameter corresponding to this viewpoint may be generated to provide an image.

Also, in the above description, the depth information is provided to each of the real camera image signals, but in a modification, the depth information may be provided for only some of the real camera image signals. In this case, preferably, the receiver may generate an image by using one of the real camera image signals as a base image signal.

As described above, the present invention can be utilized for a multi-view image generation using a free viewpoint video and a stereo image. Also, the present invention can be used for generating several intermediate view interpolation images from the previously captured stereo image and converting the same into 3D video.

In addition, the present invention can be utilized for naturally mixing a real video image and a graphics image.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A method for displaying a three-dimensional (3D) image in an image display device, the method comprising:
receiving, via a receiving unit, a broadcast signal including a broadcast image and signaling information;
parsing the signaling information from the broadcast signal,
wherein the signaling information includes intrinsic camera parameters and extrinsic camera parameters, and
wherein the intrinsic camera parameters specify optical characteristics of at least one of a real camera and a virtual camera, and the extrinsic camera parameters indicate a geometrical position and direction of the at least one of the real camera and the virtual camera;
wherein the extrinsic camera parameters include a first field indicating whether a parameter included in the extrinsic camera parameters is related to the real camera or the virtual camera;
generating a virtual view image using the intrinsic camera parameters and the extrinsic camera parameters at a virtual camera position; and
formatting, via a formatter, the virtual view image and the broadcast image for displaying the 3D image in the image display device,
wherein the extrinsic camera parameters further include a third field specifying an identifier of the real camera or the virtual camera, and
wherein the extrinsic camera parameters further include a fourth field specifying intrinsic camera parameters which are applied to a camera having the identifier specified by the third field included in the extrinsic camera parameters.

2. The method of claim 1, wherein the extrinsic camera parameters further include a second field specifying a PID value of a video elementary stream ES related to the parameter when the first field indicates the parameter included in the extrinsic camera parameters is related to the real camera.

3. The method of claim 1, wherein the extrinsic camera parameters further includes a fifth field indicating a priority of a viewpoint of the camera to be output in a stereoscopic broadcasting.

4. An apparatus for displaying a three-dimensional (3D) image, the apparatus comprising:
a broadcast signal receiving unit configured to receive a broadcast signal including a broadcast image and signaling information;
a signaling processor configured to parse the signaling information from the broadcast signal,
wherein the signaling information includes intrinsic camera parameters and extrinsic camera parameters, and
wherein the intrinsic camera parameters specify optical characteristics of at least one of a real camera and a virtual camera, and the extrinsic camera parameters indicate a geometrical position and direction of the at least one of the real camera and the virtual camera;
wherein the extrinsic camera parameters include a first field indicating whether a parameter included in the extrinsic camera parameters is related to the real camera or the virtual camera;
a rendering unit configured to generate a virtual view image using the intrinsic camera parameters and the extrinsic camera parameters at a virtual camera position; and
a formatter configured to format the virtual view image and the broadcast image for displaying the 3D image in the image display device,
wherein the extrinsic camera parameters further include a third field specifying an identifier of the real camera or the virtual camera, and
wherein the extrinsic camera parameters further include a fourth field specifying intrinsic camera parameters which are applied to a camera having the identifier specified by the third field included in the extrinsic camera parameters.

5. The apparatus of claim 4, wherein the extrinsic camera parameters further include a second field specifying a PID value of a video elementary stream ES related to the parameter when the first field indicates the parameter included in the extrinsic camera parameters is related to the real camera.

6. The apparatus of claim 4, wherein the extrinsic camera parameters further include a fifth field indicating a priority of a viewpoint of the camera to be output in a stereoscopic broadcasting.

* * * * *